United States Patent [19]
Paver et al.

[11] Patent Number: 6,055,620
[45] Date of Patent: *Apr. 25, 2000

[54] APPARATUS AND METHOD FOR SYSTEM CONTROL USING A SELF-TIMED ASYNCHRONOUS CONTROL STRUCTURE

[75] Inventors: Nigel C. Paver; Paul Day, both of Manchester, United Kingdom

[73] Assignees: LG Semicon Co., Ltd., Cheongju, Rep. of Korea; Cogency Technology Incorporated, Ontario, Canada

[*] Notice: This patent is subject to a terminal disclaimer.

[21] Appl. No.: 08/932,956

[22] Filed: Sep. 18, 1997

[51] Int. Cl.⁷ ....................................................... G06F 5/00
[52] U.S. Cl. .............................. 712/201; 712/3; 712/206; 712/213
[58] Field of Search ................................... 395/375, 775, 395/650, 392, 391, 386; 712/201, 206, 213, 3

[56] References Cited

U.S. PATENT DOCUMENTS

| | | | |
|---|---|---|---|
| 4,450,519 | 5/1984 | Guttag et al. | 712/33 |
| 4,837,740 | 6/1989 | Sutherland | 395/310 |
| 5,367,638 | 11/1994 | Niessen et al. | 395/877 |
| 5,430,851 | 7/1995 | Hirata et al. | 395/388 |
| 5,488,729 | 1/1996 | Vegesna et al. | 712/209 |
| 5,579,526 | 11/1996 | Watt | 396/559 |
| 5,590,352 | 12/1996 | Zuraski, Jr. et al. | 712/23 |
| 5,627,982 | 5/1997 | Hirata et al. | 395/382 |
| 5,848,255 | 12/1998 | Kondo | 395/388 |
| 5,870,578 | 2/1999 | Mahalingaiah et al. | 395/391 |

FOREIGN PATENT DOCUMENTS

| | | |
|---|---|---|
| 0 312 764 | 4/1989 | European Pat. Off. . |
| 0 583 089 A3 | 2/1994 | European Pat. Off. . |
| WO 97/13201 | 4/1997 | WIPO . |

OTHER PUBLICATIONS

"A Fully Asynchronous Digital Signal Processor Using Self–Timed Circuits", Gordon M. Jacobs et al., IEEE Journal of Solid–State Circuits, vol. 25, No. 6, pp. 1526–1537.

Gordon M. Jacobs et al., "A Fully Asynchronous Digital Signal Processor Using Self–Timed Circuits," IEEE Journal of Solid–State Circuits, vol. 25, No. 6, Dec. 1990, pp. 1526–1537.

*Primary Examiner*—Meng-Ai T. An
*Assistant Examiner*—Nabil El-Hady
*Attorney, Agent, or Firm*—Fleshner & Kim

[57] ABSTRACT

A control apparatus and method is provided for controlling operations of functional units in systems. The control apparatus and method implement a set of operations that can include dependencies between the functional units of a system to complete each operation. For example, in an asynchronous digital processor, self-timing and inter-block communication are used to implement a self-timed scheduler. The self-timed scheduler and method implement an instruction set using a plurality of functional units of the asynchronous digital processor. A scheduler can include a scheduler decoder that decodes each instruction to generate functional unit schedule and control information, a communication device and a plurality of scheduler functional unit controllers, wherein each of the scheduler functional unit controllers corresponds to one of the plurality of functional units of a system.

30 Claims, 9 Drawing Sheets

APPARATUS AND METHOD FOR SYSTEM CONTROL USING A SELF-TIMED ASYNCHRONOUS CONTROL STRUCTURE

BACKGROUND OF THE INVENTION

1. Field of the Invention

The present invention relates to data processing systems, and in particular, to a scheduler and method for a digital processor.

2. Background of the Related Art

A processor such as a microprocessor, micro controller or a digital signal processor (DSP) processor includes of a plurality of functional units, each with a specific task, coupled with a set of binary encoded instructions that define operations on the functional units within the processor architecture. The binary encoded instructions can then be combined to form a program that performs some given task. Such programs can be executed on the processor architecture or stored in memory for subsequent execution.

To operate a given program, the functional units within the processor architecture must be synchronized to ensure correct (e.g., time, order, etc.) execution of instructions. "Synchronous" systems apply a fixed time step signal (i.e., a clock signal) to the functional units to ensure synchronized execution. Thus, in related art synchronous systems, all the functional units require a clock signal. However, not all functional units need be in operation for a given instruction type. Since the functional units can be activated even when unnecessary for a given instruction execution, synchronous systems can be inefficient.

The use of a fixed time clock signal (i.e., a clock cycle) in synchronous systems also restricts the design of the functional units. Each functional unit must be designed to perform its worst case operation within the clock cycle even though the worst case operation may be rare. Worst case operational design reduces performance of synchronous systems, especially where the typical case operation executes much faster than that of the worst case criteria. Accordingly, synchronous systems attempt to reduce the clock cycle to minimize the performance penalties caused by worst case operation criteria. Reducing the clock cycle below worst case criteria requires increasingly complex control systems or increasingly complex functional units. These more complex synchronous systems reduce efficiency in terms of area and power consumption to meet a given performance criteria such as reduced clock cycles.

Related art self-timed systems, also known as asynchronous systems, remove many problems associated with the clock signal of synchronous systems. Accordingly, in synchronous systems, performance penalties only occur in an actual (rare) worst case operation. Accordingly, asynchronous systems can be tailored for typical case performance, which can result in decreased complexity for processor implementations that achieve the performance requirements. Further, because asynchronous systems only activate functional units when required for the given instruction type, efficiency is increased. Thus, asynchronous systems can provide increased efficiency in terms of integration and power consumption.

By coupling such functional units together to form larger blocks, increasingly complex functions can be realized. FIG. 1 shows two such functional units coupled via data lines and control lines. A first functional unit 100 is a sender, which passes data. The second functional unit 102 is a receiver which receives the data.

Communication between the functional units 100, 102 is achieved by bundling data wires 104. Self-timed or asynchronous methodology uses functional units with an asynchronous interface protocol for the passing of data and control status. A request control wire REQ is controlled by the sender 100 and is activated when the sender 100 has placed valid data on the data wires 104. An acknowledge control wire ACK is controlled by the receiver 102 and is activated when the receiver 102 has consumed the data that was placed on the data wires 104. This asynchronous interface protocol is known as a "handshake" because the sender 100 and the receiver 102 both communicate with each other to pass the bundled data.

The asynchronous interface protocol shown in FIG. 1 can use various timing protocols for data communication. One related art protocol is based on a 4-phase control communication scheme. FIG. 2 shows a timing diagram for the 4-phase control communication scheme.

As shown in FIG. 2, the sender 100 indicates that the data on the data wires 104 is valid by generating an active request control wire REQ high. The receiver 102 can now use the data as required. When the receiver 102 no longer requires the data, it signals back to the sender 100 an active acknowledge control wire ACK high. The sender 100 can now remove the data from the communication bus such as the data wires 104 and prepare the next communication.

In the 4-phase protocol, the control lines must be returned to the initial state. Accordingly, the sender 100 deactivates the output request by returning the request control wire REQ low. On the deactivation of the request control wire REQ, the receiver 102 can deactivate the acknowledge control wire ACK low to indicate to the sender 100 that the receiver 102 is ready for more data. The sender 100 and the receiver 102 must follow this strict ordering of events to communicate in the 4-phase control communication scheme. Beneficially however, there is no upper bound on the delays between consecutive events.

A first-in first-out (FIFO) register or pipeline provides an example of self-timed systems that couple together a number of functional units. FIG. 3 shows such a self-timed FIFO structure. The functional units can be registers 300a–300c with both an input interface protocol and an output interface protocol. When empty, each of the registers 300a–300c can receive data via an input interface 302 for storage. Once data is stored in the register the input interface cannot accept more data. In this condition, the register 300a input has "stalled". The register 300a remains stalled until the register 300a is again empty. However, once the register 300a contains data, the register 300a can pass the data to the next stage (i.e., register) of the self-timed FIFO structure via an output interface 304. The registers 300a generate an output request when the data to be output is valid. Once the data has been consumed and the data is no longer required, the register 300a is then in the empty state. Accordingly, the register 300a can again receive data using the input interface protocol.

Chaining the registers 300a–300c together by coupling the output interface 304 to the input interface 302 forms the multiple stage FIFO or pipeline. Thus, an output interface request and acknowledge signals, Rout and Aout, are respectfully coupled to the following register 300a–300c (stage) input interface request and acknowledge signals, Rin and Ain. As shown in FIG. 3, data passed into a FIFO input 306 will be passed from register 300a to register 300c to eventually emerge at a FIFO output 308. Thus, data ordering is preserved as the data is sequentially passed along the FIFO. The FIFO structure shown in FIG. 3 can use the 4-phase control communication scheme shown in FIG. 2 as the input and output interface protocol.

To implement an asynchronous processor, a more complex array of functional units is required. Further, to process an instruction, the instruction must be decoded to activate the functional units required to perform the corresponding instruction task. However, to execute the instruction, the functional units may have dependencies such as data dependencies so that the functional units can not merely operate concurrently (e.g., within a clock cycle as in synchronous systems). Such dependencies enforce sequential operations on the functional unit activity to correctly execute each instruction.

An asynchronous processor is disclosed in "A Fully Asynchronous Digital Signal Processor Using Self-Timed Circuits" by Jacobs et al., IEEE Journal of Solid-State Circuits, Volume 25, Number 6, 1990 (hereafter Jacobs). However, the asynchronous processor in Jacobs merely initiates a preset activation order of all functional units regardless of the instruction. Accordingly, the asynchronous processor in Jacobs has disadvantages in that inefficiencies occur because unnecessary functional units are activated for a given instruction. Further inefficiencies occur because the ability to exploit potential concurrent operations by functional units that do not have data dependencies is lacking. In addition, Jacobs can not individually control the order and execution of the functional unit activity for each instruction to increase concurrency and efficiency.

The above references are incorporated by reference herein where appropriate for appropriate teachings of additional or alternative details, features and/or technical background.

SUMMARY OF THE INVENTION

An object of the present invention is to provide an apparatus and method for system control that obviates at least the above-described problems and disadvantages of the prior art.

Another object of the present invention is to provide an apparatus and method for controlling operations requiring dependencies for functional units in asynchronous systems.

Another object of the present invention is to provide a high speed asynchronous digital processor and method.

Another object of the present invention is to provide a dynamic correlation between an instruction set and a given processor architecture.

Another object of the present invention is to provide individual control of functional unit activity for each instruction defined for an asynchronous digital processor.

Another object of the present invention is to provide an asynchronous digital processor with a high degree of processor concurrency for each defined instruction.

To achieve at least the above objects in whole or in part, a data processing apparatus according to the present invention includes a plurality of functional units, wherein each functional unit performs a set of prescribed operations, a data bus that couples the functional units and a scheduler controller that decodes at least one current instruction to generate a functional unit schedule and control information.

To further achieve the above objects in whole or in part, a scheduler according to the present invention for use in a data processing apparatus having a plurality of functional units that each perform a set of prescribed operations includes a data bus coupling the functional units and a scheduler controller that decodes at least one current instruction to generate a functional unit schedule and control information.

To further achieve the above objects in whole or in part according to the present invention, a data processing apparatus, includes a plurality of functional units, each functional unit performing a set of prescribed operations, a data bus coupling the functional units, an asynchronous controller that implements variable execution times in at least the functional unit schedule, and a scheduler controller that decodes at least one current instruction to generate a functional unit schedule and control information.

To further achieve the above objects in whole or in part according to the present invention, a method of operating a data processing apparatus having a plurality of functional units coupled by a data bus, wherein each of the plurality of functional units perform a set of prescribed operations, includes decoding at least one current instruction to generate a functional unit schedule and control information.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
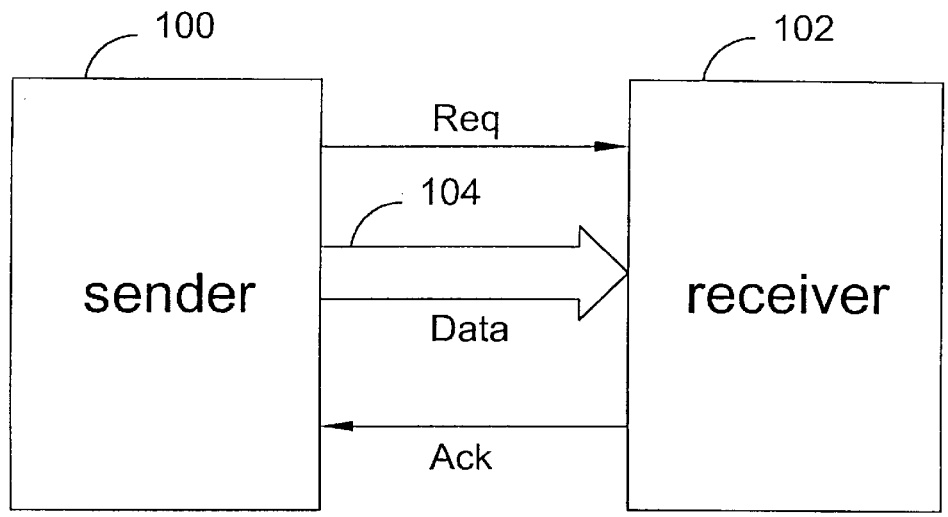
FIG. 1 is a block diagram showing a self-timed data interface.
Figure 2:
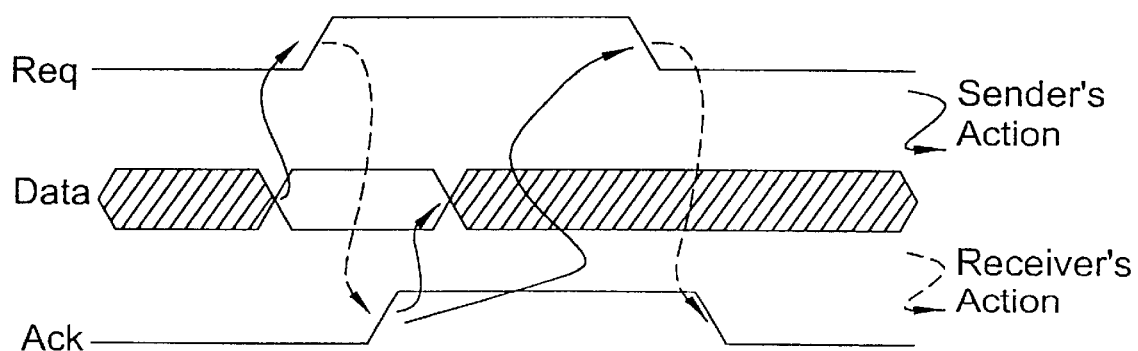
FIG. 2 is a diagram showing signal waveforms of a four-phase data interface protocol.
Figure 3:
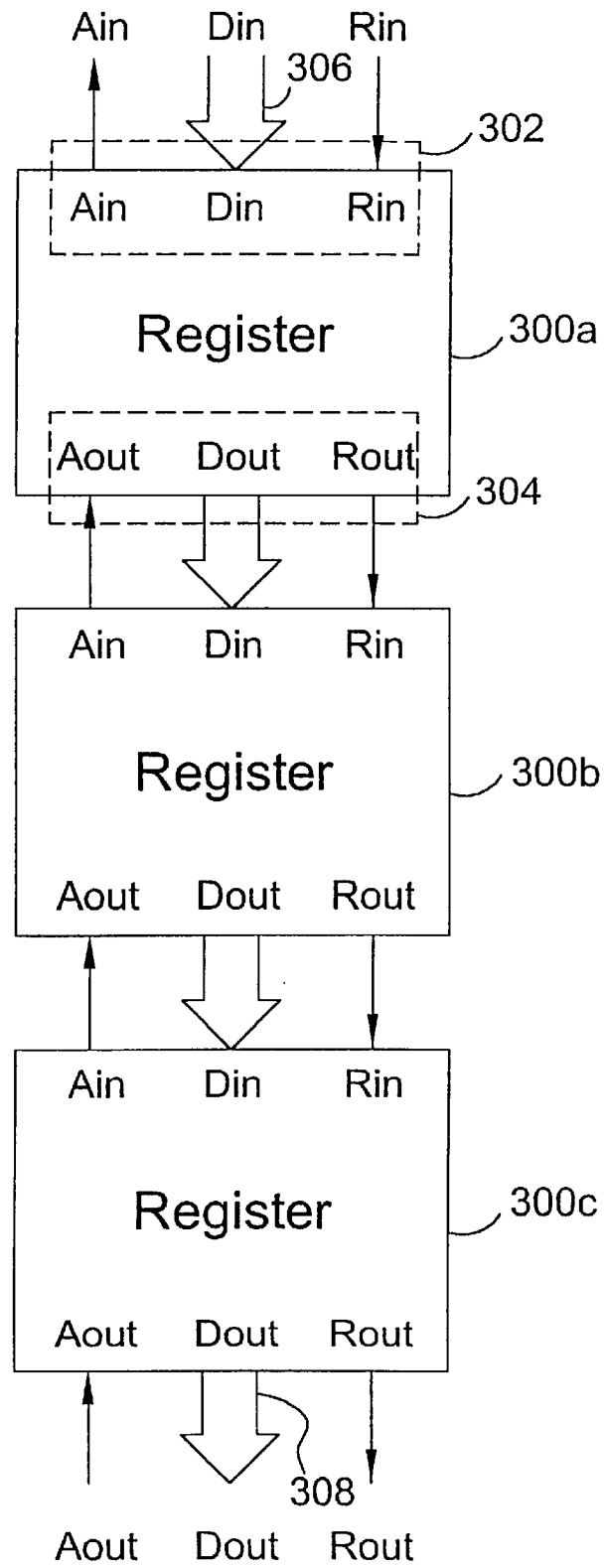
FIG. 3 is a block diagram showing a self-timed FIFO structure.
Figure 4:
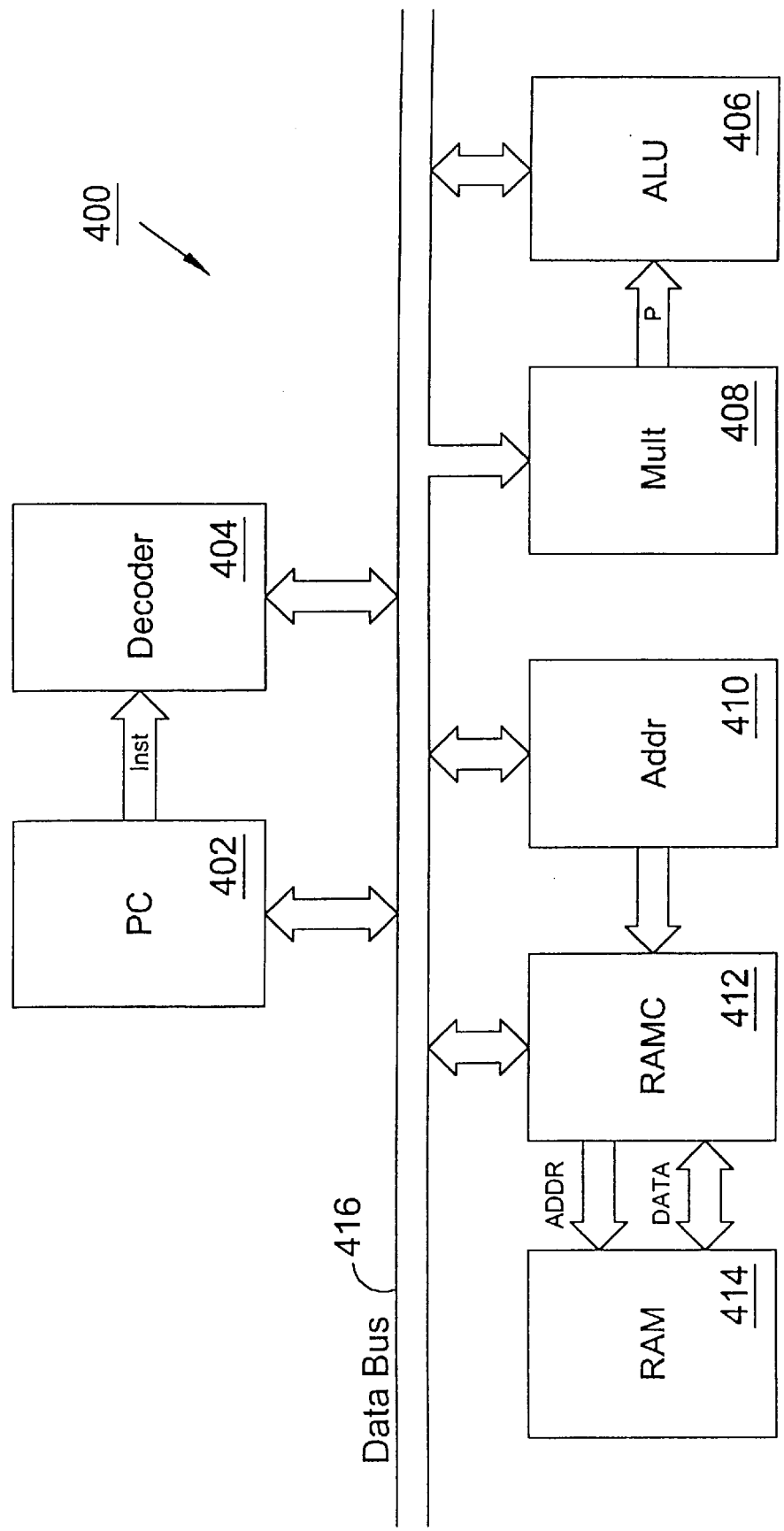
FIG. 4 is a block diagram showing a digital processor.

An exemplary processor 400 architecture is shown in FIG. 4. The processor 400 architecture includes functional units, for example, used in a microprocessor, a micro controller and DSP implementations. Each of functional units are coupled by a common resource data bus 416.

A program counter functional unit PC 402 generates an instruction program address. The PC 402 includes an address stack for holding addresses on subroutine or interrupt calls. An instruction decoder functional unit 404 controls instruction fetch and decode. The instruction decoder functional unit 404 contains an instruction decoder for generating the control of functional units and a status register for holding current process status. An arithmetic and logic functional unit ALU 406 performs data and arithmetic operations using an integer arithmetic ALU. The ALU 406 also contains a data accumulator for storing a result of a specific data or arithmetic operation.

The processor 400 further includes a multiplier functional unit MULT 408 that performs data multiplication and an indirect address register functional unit ADDR 410. The ADDR 410 holds indirect data addresses in an address register array. A Random Access Memory functional unit RAM 414 is used to store data values. A data RAM control functional unit RAMC 412 controls memory access for data memory in the RAM 414.

In the processor 400, the functional blocks can operate concurrently. However, the processor 400 must ensure correct management of the common resource data bus 416 by controlling data and sequence requirements when communications occur between functional units. Thus, the processor 400 must resolve functional unit dependencies such as data dependencies between functional units. Preferably, the architecture of the processor 400 controls communications between functional units.

Figure 5:
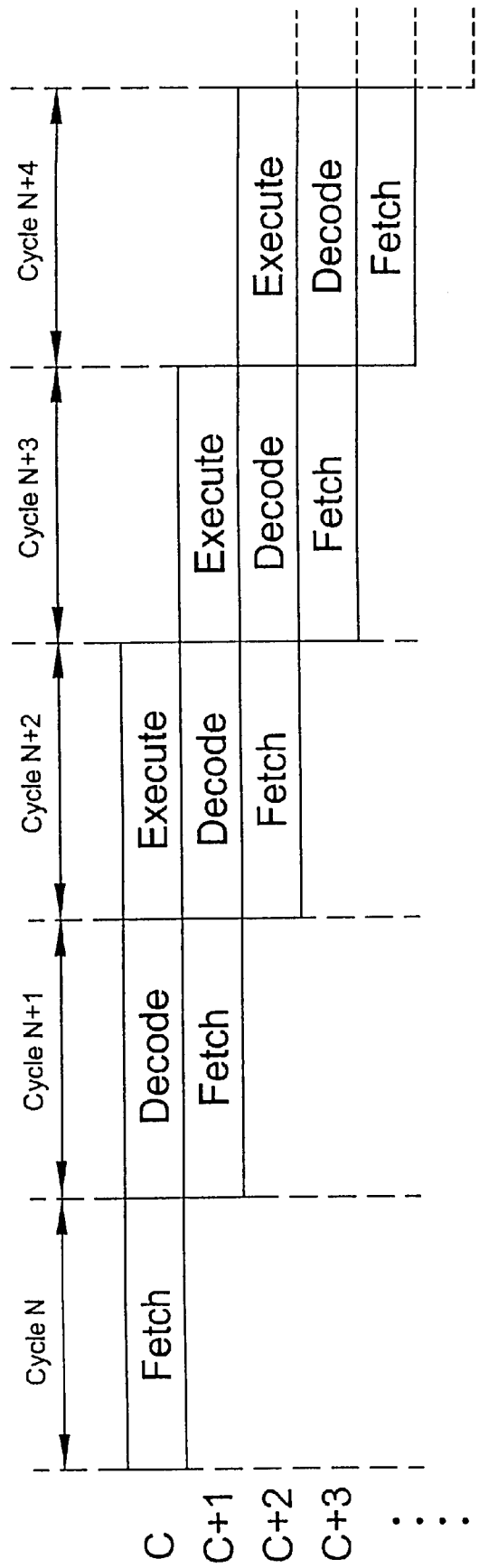
FIG. 5 is a diagram showing operations of an instruction pipeline.

The processor 400 preferably uses a 3-stage instruction pipeline composed of instruction fetch, instruction decode and instruction execute cycles. A pipelined architecture improves performance requirements by allowing more efficient (e.g., concurrent) use of the functional units of the processor architecture. As shown in FIG. 5, the 3 stage instruction pipeline allows each pipelined stage to be overlapped, which increases concurrency and processor performance.

To implement a program on a processor architecture, such as the processor 400, a set of instructions and corresponding instruction tasks must be defined. During operations, each instruction is decoded to activate the functional units required to perform the corresponding instruction task. However, to execute the corresponding instruction task for each such instruction, individual functional units may have dependencies such as data dependencies. In this case, the functional units required to be activated cannot operate concurrently but must be stalled until a particular condition (e.g., that solves the data dependency) is valid.

Figure 6:
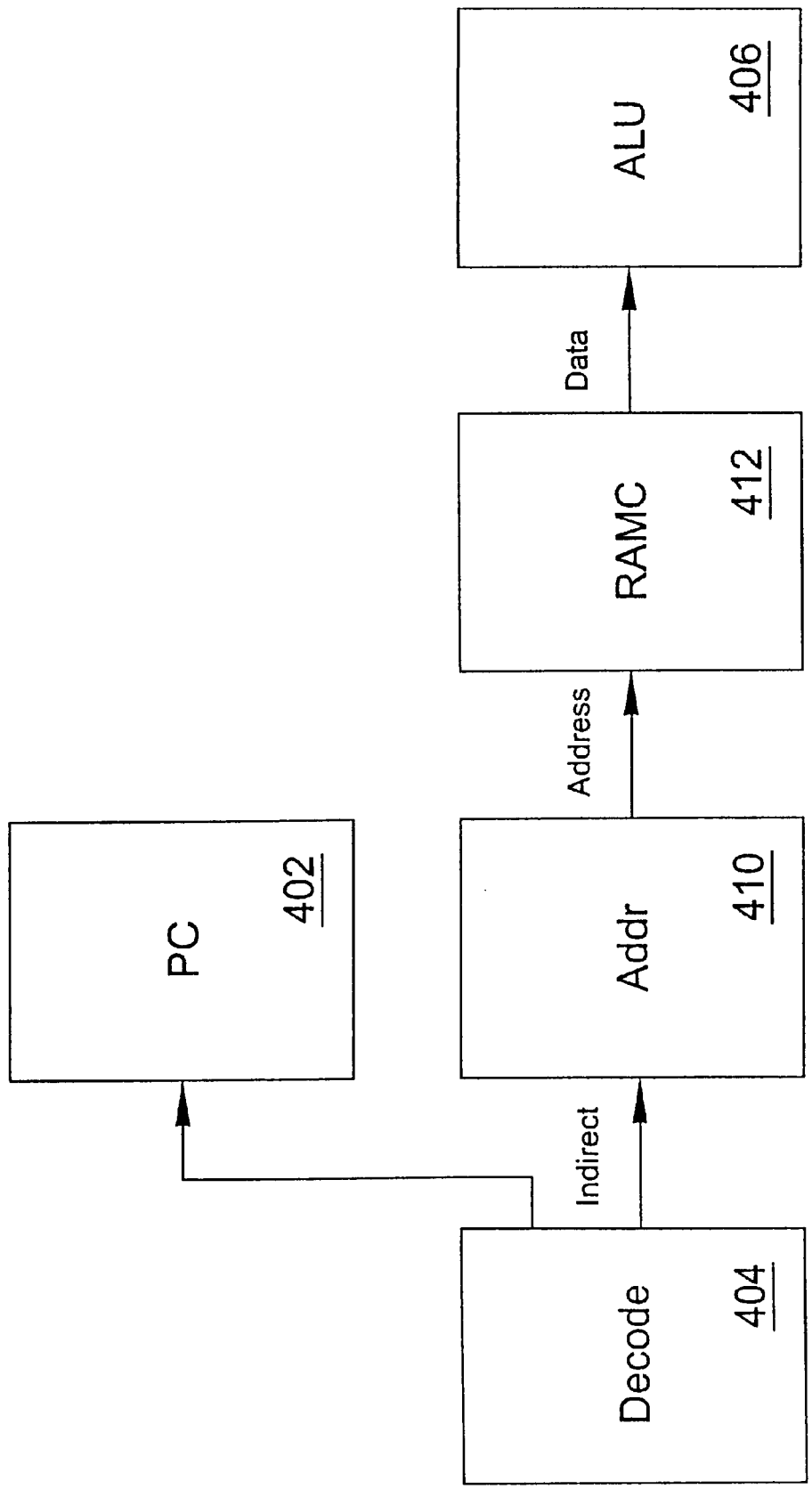
FIG. 6 is a diagram showing a functional flow of the processor of FIG. 4 for an instruction.

For example, consider an instruction "ADD*+", which is the instruction to Add Indirectly Addressed Data to the data accumulator in the ALU 406. As shown in FIG. 6, there is a dependency between functional units required by the processor 400 to perform the ADD*+ instruction. Prior to the execution of the addition within the ALU 406, the operand required by the ADD*+ instruction must be read from memory. The ALU 406 must therefore stall until the operand has been read from the RAM 414 and is valid on the data bus 416. In the processor 400, memory access is controlled by the RAMC 412. However, prior to the data read being from memory the source address of the data must be generated. For instructions using a direct mode of addressing the address pointer is usually within the instruction word. Thus, for direct mode addressing the address pointer can be passed with other decode information to the RAMC 412. However, the ADD*+ instruction uses the indirect mode of addressing. For indirect mode addressing, the address source must be generated by being read from the address register array of the ADDR 410, and the RAMC 412 must stall until the address is valid on the data bus 416.

Such dependencies illustrate sequential requirements enforced on the activity of the functional units of the processor 400 to ensure correct execution of a given instruction. Thus, FIG. 6 shows a flow diagram of activated functional units for the execution of the ADD*+ instruction by the processor 400. The PC 402 is also preferably activated by the ADD*+ instruction. The PC 402 is required by the processor 400 to generate the next instruction address and retrieve the next instruction from program memory. The concurrent operation of the PC 402 with the ADDR 410 ensures that the instruction pipeline of the processor 400 maintains a constant flow of instructions.

Figure 7:
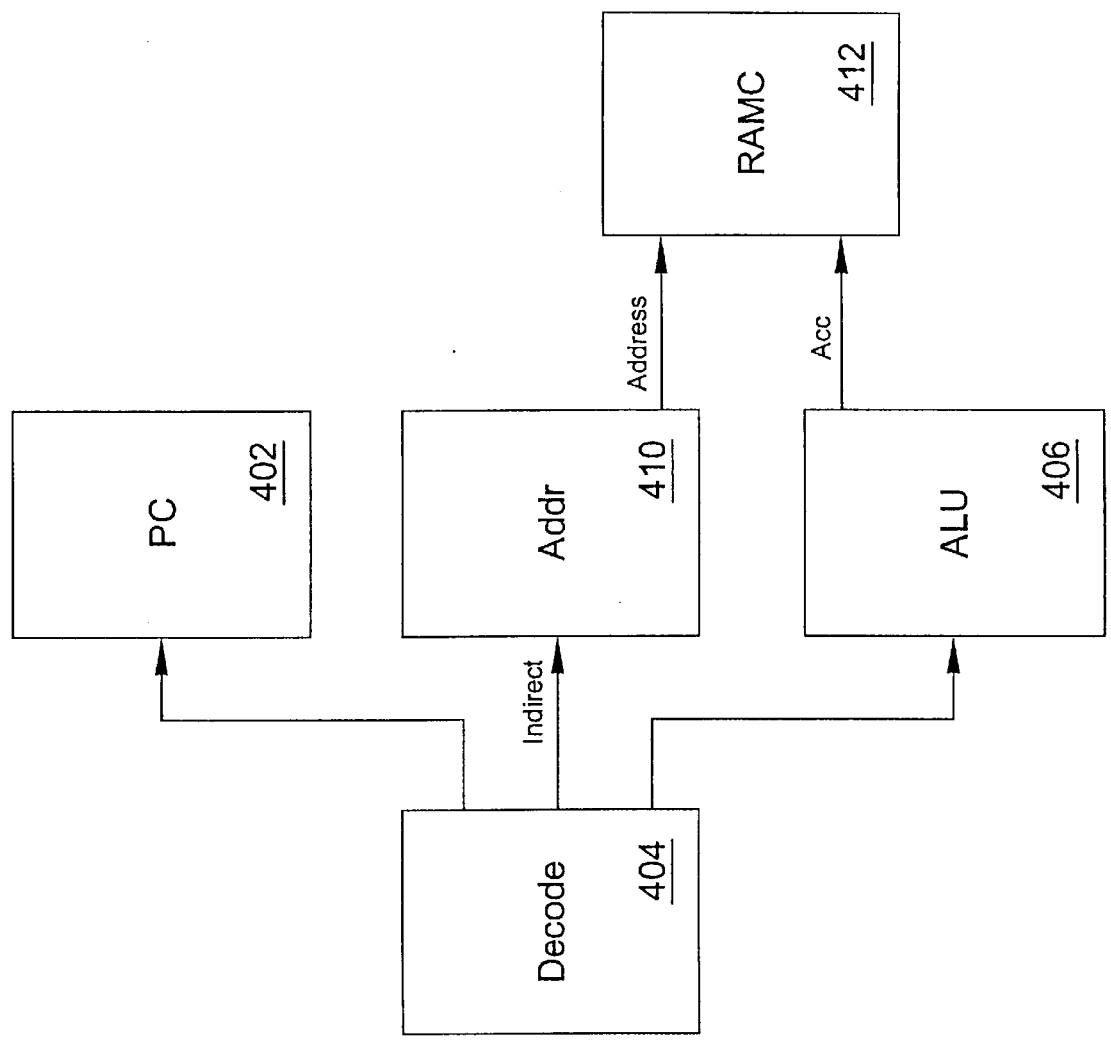
FIG. 7 is a diagram showing a functional flow of the processor of FIG. 4 for another instruction.

FIG. 7 shows a flow diagram of activated functional units in the processor 400 for another instruction, an Indirect Store Accumulator instruction "STA*+". The "STA*+" instruction stores the data accumulator to an indirectly addressed data location. For this example, prior to the activation of the RAMC 412 to store a data bus value into the data memory RAM 414, both the accumulator data must be driven onto the data bus 416 by the ALU 406 and an indirect address must be generated by the ADDR 410.

There is no interdependency between the ALU 406 and the ADDR 410 for the Indirect Store Accumulator instruction STA*+. Thus, the ALU 406 and the ADDR 410 can operate concurrently. However, the activation of the RAMC 412 is stalled until both the ALU 406 and the ADDR 410 have completed their tasks. Again, in FIG. 7, the PC 402 is shown operating in parallel with the STA*+ instruction execution because the program instruction address and fetch are required to fill the instruction pipeline.

The above-described instruction examples illustrate the complexity of management required to order and activate each functional unit within a processor to execute an instruction. Further, many instructions can be defined in an instruction set. Thus, to achieve a predetermined level of concurrancy for the functional units activated when performing an instruction set, many different flow diagrams are required. Similarly, such management control would be required for an asynchronous system using a set of functional blocks to perform defined operations.

Figure 8:
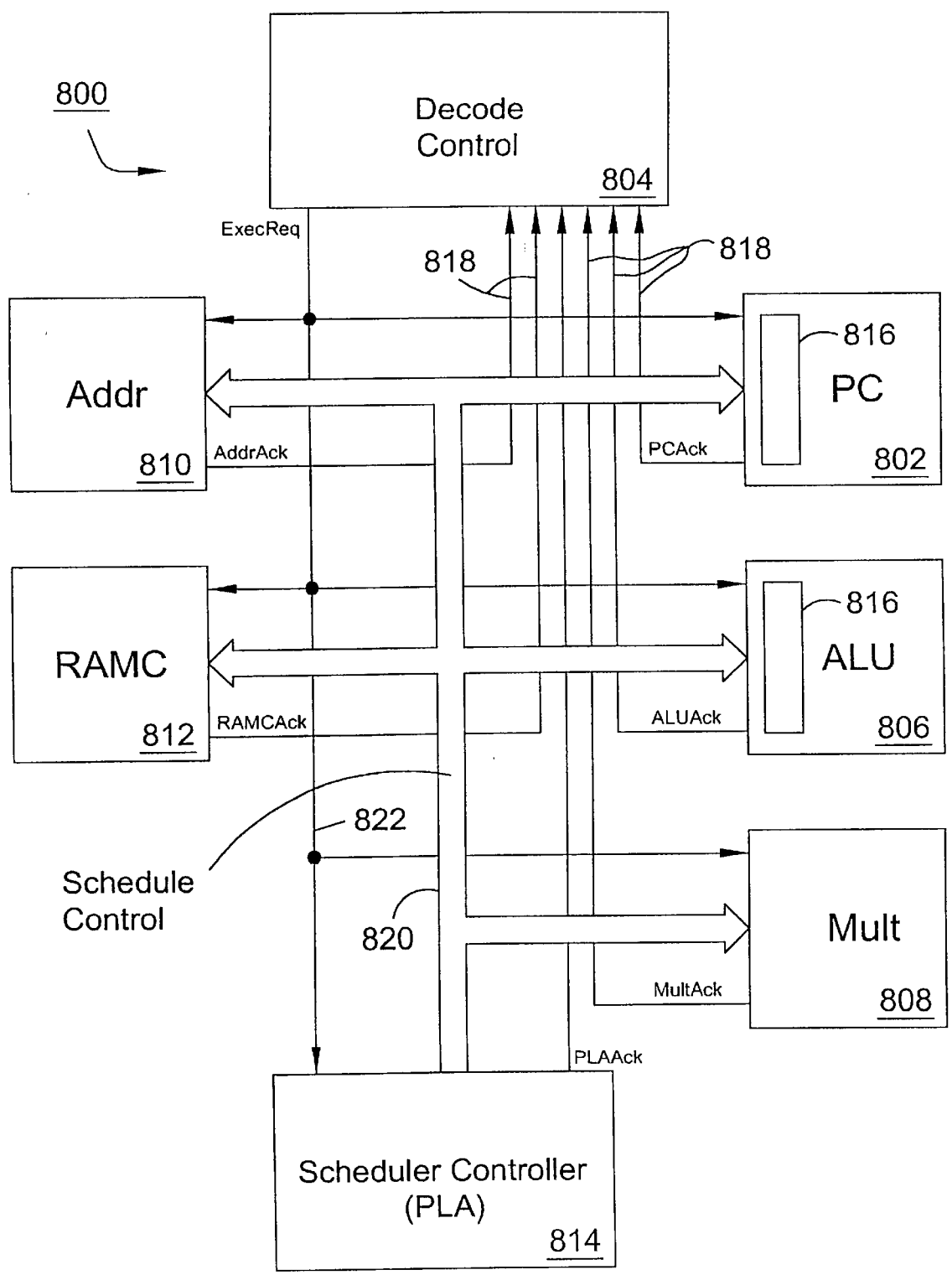
FIG. 8 is a diagram showing a preferred embodiment of a scheduler in a self-timed processor according to the present invention.

To achieve the control required for implementing an instruction set on a processor such as the processor 400 architecture, a preferred embodiment of an apparatus and method for asynchronous system control according to the present invention will now be described. As shown in FIG. 8, a processor 800 architecture includes the preferred embodiment of a self-timed scheduler. The processor 800 includes exemplary functional units: a PC 802, an ALU 808, a MULT 808, an ADDR 810, a RAMC 812. The operations of the functional units of the processor 800 are similar to the operation of the functional units of the processor 400 described above. Accordingly, a detailed description will be omitted. However, the present invention is not intended to be so limited. Additional, fewer or alternative functional units used to implement the processor 800 based on the intended operational requirements and environment would be within the scope of the present invention.

As shown in FIG. 8, a decode functional unit is preferably split into two separate functional units including a decode instruction functional unit 804 and a scheduler controller functional unit 814. The decode instruction control 804 controls the self-timing of the instruction execution phase and contains additional functionality such as status registers. The scheduler controller 814 decodes the current instruction and also generates the relevant functional control bundles for each of the functional units. The scheduler controller 814 thus preferably incorporates similar functionality of portions of the instruction decoder 404. FIG. 8 also shows a scheduler control bus 820 that feeds the relevant schedule control data to each functional unit via a scheduler functional unit controller 816, functional unit request control lines 822 and functional unit acknowledge control lines 818.

The self-timed scheduler includes the scheduler controller 814, the scheduler control bus 820 and the self-timed scheduler functional unit controller 816 in the input protocol for each functional unit of the processor 800 and corresponding additional control bits bundled with the control data bus. The additional control bits that implement the self-timed scheduler functionality are preferably generated, along with the required functional control bits for each functional unit, within the scheduler controller unit 814. Control data bundles are preferably generated using a programmable logic array (PLA) where each instruction mnemonic is input to the PLA and the appropriate control bundles for each functional unit are generated as output.

Operations of the preferred embodiment of the self-timed scheduler will now be described. As shown in FIG. 8, for an execution cycle of each instruction in the processor 800, the decode instruction control 804 generates an active execute request signal ExecReq to all functional units. At this point, all the control data bundles from the scheduler controller 814 for each of the functional units are valid because the control data bundles were generated in the execution cycle for the previous instruction (e.g., see FIG. 6).

On receipt of the execute request signal ExecReq, each functional unit will activate based on control information in the scheduler controller 814 control data bundle transmitted via the scheduler control bus 820. The control information can preferably initiate one of three possible operations in the functional unit. The three operations include Bypass, Activate (unconditional) and Stall (conditional). However, the present invention is not intended to be so limited. For example, any set of operations that accomplish at least the following operations could be used.

In the Bypass operation, a functional unit is not required for the execution of an instruction task for the current instruction. Thus, the functional unit is bypassed. The functional unit will immediately generate a corresponding acknowledge signal (e.g., ALUAck for the ALU 806) signaling its completion. In the Activate (unconditional) operation, the functional unit begins operations as defined by the control information from the scheduler controller 814. On completion of its function, the functional unit generates the corresponding acknowledge signal. In the Stall (conditional) operation, the functional unit stalls until one or more additional functional units have completed their respective operations (e.g., a function and the corresponding acknowledge signal). For the stall (conditional) operation, the functional unit has dependencies based on the operations of other functional units. Accordingly, the functional unit must wait until the completion of the one or more functional units on which its activation is stalled.

The scheduler functional unit controller 816 for each functional unit stalls a corresponding functional unit until the data dependencies have been resolved. In other words, the scheduler functional unit controller 816 for each functional unit monitors the acknowledge signals, for example, by using the acknowledge control wires 818 of the additional functional units on which its activation is stalled. As discussed above, on completion of its function, each of the functional units activates the corresponding acknowledge control wire 818. When the scheduler functional unit controller 816 has successfully monitored the completion of all the functional units on which its activation is stalled, the functional unit can be activated, carry out its function, and acknowledge back to the decode instruction control 804 its completion.

As the processor 800 preferably uses a 4-phase control protocol, the decode instruction control 804 preferably initiates a recovery cycle when all functional units have completed their functions as signaled through the acknowledge control lines 818. The decode instruction control 804 can then prepare for the next instruction execution cycle.

However, with the 4-phase control protocol, two functional units in the processor 800 cannot be dependent on each other because a stall in this case can lead to a deadlock condition. In the deadlock condition, neither functional unit activates until the other functional unit has completed its function. However, the present invention is not intended to be limited to disallow cross-dependency caused by the 4-phase control protocol. For example, to prevent deadlock an alternative interface protocol or a priority scheme could be used to permit functional units to be dependent on each other.

The scheduler controller 814 is not a functional unit in the same sense as the ALU 806 or RAMC 812 functional units. The scheduler controller 814 decodes the instruction for the next execution phase. Therefore, the scheduler controller 814 operates in parallel with the current instruction execution cycle and outputs data that controls all the functional units. Thus, the scheduler controller 814 cannot be updated until all functional units have completed and the previously executed control data bundle is no longer required. Use of a 4-phase control protocol can be used for the self-timed scheduler operations because the decode instruction control 804 sets the ExecReq signal low upon entering the recovery phase. The low ExecReq signal indicates to the scheduler controller 814 that its preceding control data bundle is no longer required and can be updated for the next execution cycle. Accordingly, the scheduler controller 814 returns an acknowledge signal PLAAck low to indicate that the new control data bundle is now valid and the next execution cycle can be activated.

Thus, the preferred embodiment of the self-timed scheduler can dynamically define execution ordering, concurrency and sequentiality of all the functional units under its control. Further, additional instructions can be subsequently added to the instruction set, for example, by only implementing the added instruction mnemonic in the PLA to generate a control data bundle. Similarly, subsequent functional units can easily be incorporated into the processor architecture by using a protocol such as a scheduler functional unit controller.

Figure 9:
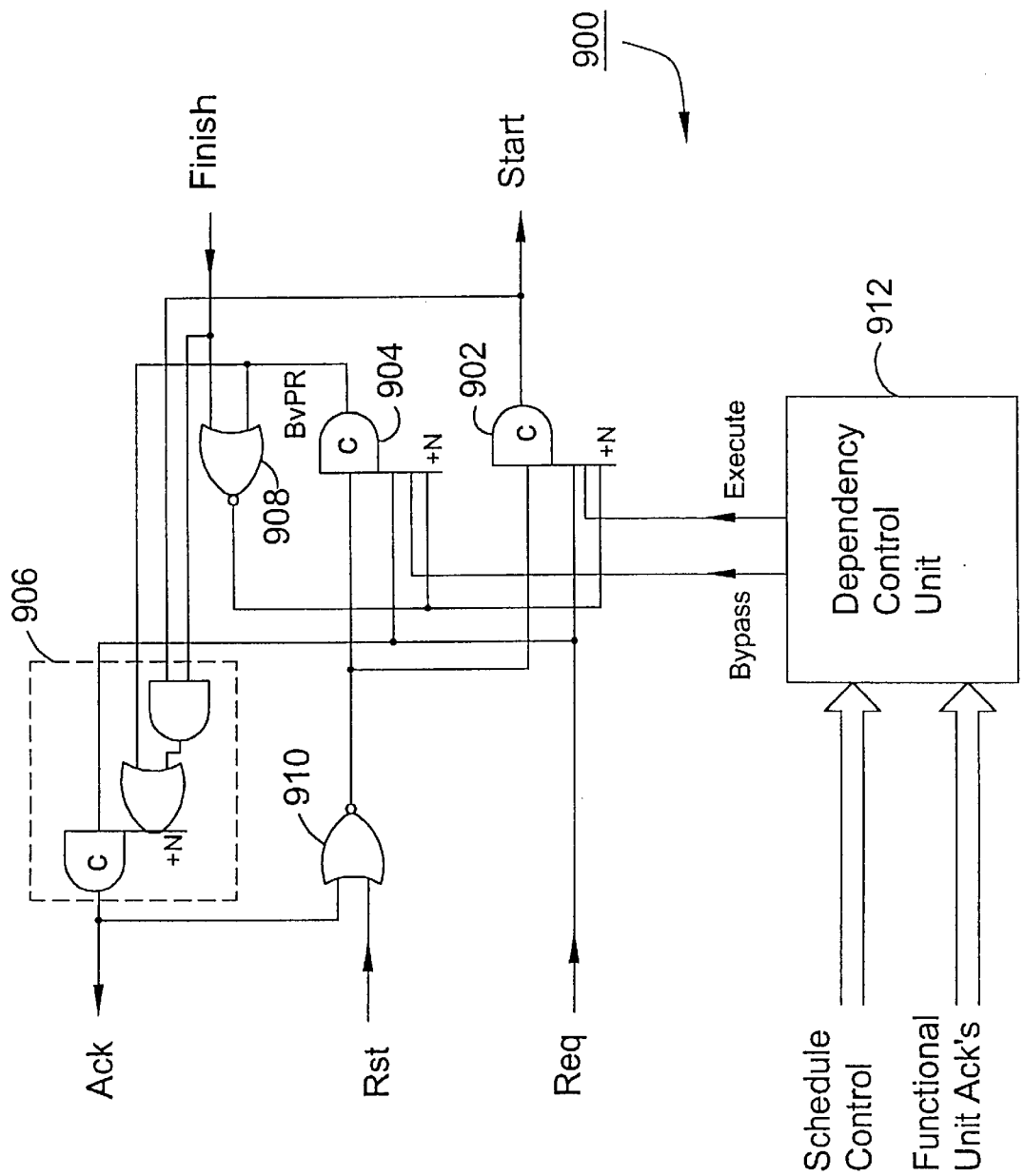
FIG. 9 is a diagram showing a preferred embodiment of a scheduler functional unit controller according to the present invention.

A preferred embodiment of a scheduler functional unit control circuit will now be described. However, the present invention is not intended to be limited to this because alternative interface protocols could be used. FIG. 9 shows a circuit diagram of such a scheduler functional unit control circuit 900 that can be used as the scheduler functional unit controller 816 in the processor 800. Accordingly, the scheduler functional unit control circuit will be described based on 4-phase control protocol.

Figure 10:
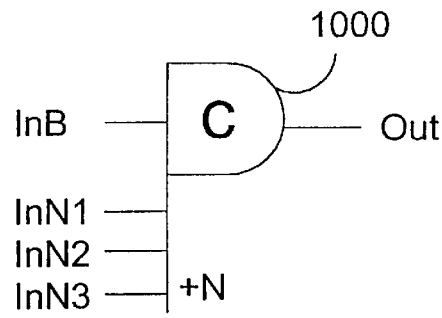
FIG. 10 is a diagram showing an asymmetric C-gate.

The scheduler functional unit control circuit 900 includes two asymmetric C-gates 902, 904, a complex 4-input C-gate 906, and two NOR gates 908, 910. C-gates can operate as an AND function for self-timed events. Many different implementations of C-gates exist, however, all perform the basic functionality that one input condition instantiates a high on the C-gate output, a different input condition instantiates a low on the C-gate output and the remaining input conditions of the C-gate input pins retain a previous set output. FIG. 10 shows an exemplary 4-input asymmetric C-gate element 100, which is a special case of the standard Muller C-gate. This form of C-gate is known as an asymmetric C-gate because all input pins effect the setting of the gate output high, however, only one input pin effects the setting of the gate output low. The Asymmetric C-gate 1000 shown in FIG. 10 has the following functionality:

---
IF InB AND InN1 AND InN2 AND InN3 THEN Out → High;
ELSE IF/InB THEN Out → Low; and
ELSE no change on Out.
---

The asymmetric C-gate 1000 is preferably used as the C-gates 902, 904 in the scheduler functional unit controller 900.

Figure 11:
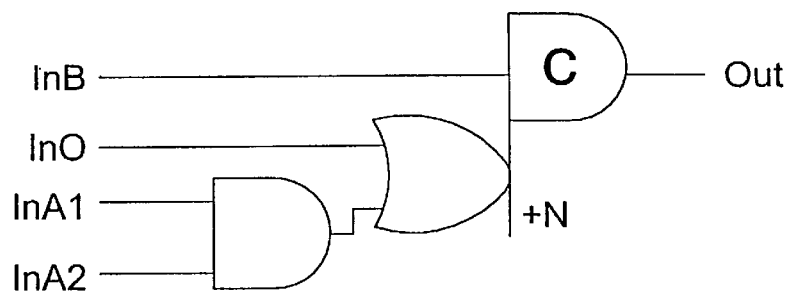
FIG. 11 is a diagram showing a complex asymmetric 4-input C-gate.

As shown in FIG. 11, the complex asymmetric C-gate 906 has the following functionality:

---
IF InB AND (In0 OR (InA1 AND InA2)) THEN Out → High;
ELSE IF/InB THEN Out → Low; and
ELSE no change on Out.
---

The scheduler functional unit control circuit 900 includes: request, acknowledge, start, finish, and reset interface signals. The request signal Req requests input (e.g., from the decode instruction control 804) to initiate functional unit activity. The acknowledge signal Ack is output on completion of the functional unit activity (e.g., bypass). The start signal Start is the functional unit internal activate signal. The finish signal Finish is the functional unit internal completion signal. The reset signal Rst is a circuit reset signal that initializes the state of control logic. As shown in FIG. 9, the reset signal Rst is set active high.

FIG. 9 also shows an additional depending control unit 912. Inputs to the dependency control unit 912 preferably include the control data bundle and the monitored functional unit acknowledge signals.

Operations of the scheduler functional unit controller 900 will now be described. After initialization, the scheduler functional unit controller 900 is activated by a positive going input request signal, Req. The request signal Req will then transitions an output of one of the two C-gates 902, 904 high dependent on the control signals, Bypass and Execute. If the Bypass signal is high then the output of C-gate 904 will transition its output high. The high output of the C-gate 904 indicates that the corresponding functional unit (not shown) will be bypassed. The C-gate 904 then activates a signal ByPR, which in turn transitions an output of the C-gate 906 high to generate the acknowledge signal, Ack. The scheduler functional unit controller 900 then must go through a recovery phase with the input request signal Req going low, which in turn resets the output acknowledge signal Acq low.

If, on an active request, the control signal Execute is high, the output of the C-gate 902 will transition high. The high output of the C-gate 902 activates the corresponding functional unit internal signal Start to initiate its activity. Completion of the corresponding functional unit activity is signaled by the internal signal Finish transitioning active high. The high internal signal Finish in turn will transition the output of the complex C-gate 906 high, which generates the output acknowledge signal Ack.

The scheduler functional unit controller 900 preferably has additional functionality that adds a safety feature to the circuit. The signals Finish and ByPR are fed through the 2-input NOR gate 908 to prevent the incorrect output signal transitions of the inactivated C-gates 902, 904. The NOR gate 908 allows the control signals, Execute and Bypass, to become undefined after an active acknowledge signal Acq has been generated. The feedback loop disables the activation (active high output signal) of either C-gates 902, 904 until both gates have returned to their initial low state, which indicates the completion of their 4-phase protocol cycle. Note that the control signals Execute and Bypass must never be both active (high) when an active high request occurs. In this case, both C-gates 902, 904 will activate causing unpredictable behavior and possibly deadlock.

Figure 12:
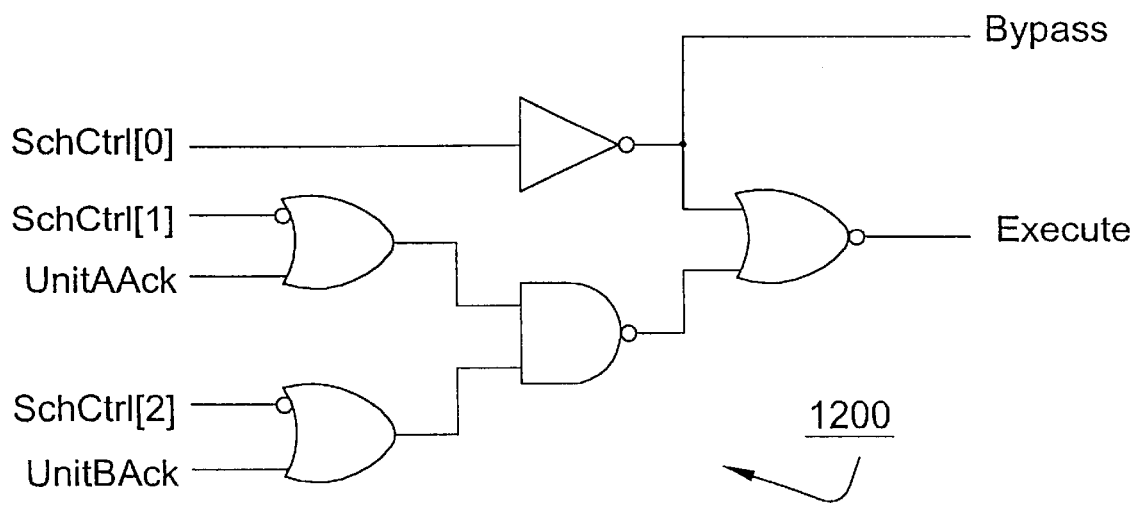
FIG. 12 is a diagram showing a preferred embodiment of a schedule control logic according to the present invention.

The control signals Bypass and Execute are preferably generated by the self-timed scheduler from the control data bundle and monitored functional unit acknowledge signals. FIG. 12 shows an exemplary control circuit 1200 example for a functional unit with dependencies on two other functional units, A and B (not shown). The control circuit 1200, for example, can be used as the dependency control unit 912 of the scheduler functional unit controller 900.

For the control circuit 1200, a 3-bit schedule control data bundle is required. The 3-bit schedule control data bundle is shown as the data bundle SchCtrl[2:0] in FIG. 12. Exemplary bit definitions of the data bundle SchCtrl[2:01] the bit signal SchCtrl[0] being high activates the corresponding functional unit. If the bit signal SchCtrl[0] is low, the corresponding functional unit is bypassed. If the bit signal SchCtrl[1] is high, wait for the functional unit A acknowledge signal, UnitAAck, high before activating the corresponding functional unit. If the SchCtrl[1] bit signal is low do not wait before activation. The SchCtrl[2] bit signal operates similar to the SchCtrl[1] except in relation to the functional unit B.

Therefore, if SchCtrl[0] is low, the Bypass signal is set high and the functional unit is not activated. Note that when the Bypass signal is set high, the Execute signal is preferably forced low to ensure that both signals do not activate at the same time. If SchCtrl[0] is high, the Bypass signal is disabled. However, the activation of the Execute signal is dependent on the remaining bits of the schedule control data bundle. If all remaining bits (e.g., SchCtrl[2:1]) are low, then the functional unit has no data dependencies and the Execute signal will be set high to activate the functional unit. If remaining control bits of the scheduler control data bundle are high, then data dependencies exist and the Execute signal is remains low to stall activation of the functional unit. If the control bits SchCtrl[0] and SchCtrl[1] are both high, the Execute signal will stay low until the UnitAAck signal goes high, with the resolution of the dependency in functional unit A allowing the stalled functional unit to proceed. If more than one bit of the control data bundle is set (e.g., SchCtrl[1] and SchCtrl[2] both high), the Execute signal will remain low until each selected dependency is resolved.

Although the control circuit 1200 monitors two functional units, A and B, the present invention is not intended to be so limited. Accordingly, the self-timed scheduler can monitor one, three or more dependencies. However, a predetermined amount of set-up time is required to guarantee that the Bypass and Execute signals are in a valid state before the active high request signal Req is input to the schedule control circuit 1200.

As described above, the preferred embodiments of the apparatus and method to control asynchronous systems according to the present invention can be configured to implement any instruction type onto the functional units provided, which enables functional unit execution to be in any required sequential ordering, concurrent ordering or not activated at all. Further, additional functional units can be added to the architecture to increase functionality or performance with simple additions to the scheduler decoder and control circuits.

Although the scheduler has been described in reference to a particular design, the concept is applicable to the control of general self-timed circuits with inter-communicating sub-blocks and not just processor architectures as has been so far described. The self-timed scheduler was implemented in a self-timed DSP design using a 4-phase control scheme. However, alternative self-timed interface protocols other than the 4-phase control scheme can be used.

As described above, the preferred embodiments according to the present invention implement efficient function or work scheduling in a generalized architecture (e.g., a processor architecture), and in particular, for highly configurable architectures (e.g., a processor architecture in which new instructions and hardware can be added). Further, the preferred embodiments of the self-timed scheduler according to the present invention can simplify the control structures for digital processors. In addition, the self-timed scheduler can be used to support a highly configurable processor architecture dependent on instruction execution that easily adds new instructions and new hardware. The preferred embodiments according to the present invention use self-timing and inter-block communication to implement the preferred embodiments of the apparatus and method for control of asynchronous systems.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A data processing apparatus, comprising:
   a plurality of functional units, each functional unit performing a set of prescribed operations;
   a scheduler controller that decodes at least one current instruction to generate a functional unit schedule and control information, wherein an asynchronous control structure implements the current instruction using self-timing initiation by request signals and self-timing completion by acknowledgment signals to control execution of a subset of the functional units according to the functional unit schedule; and
   a communications device coupling the functional units and the scheduler controller.

2. The data processing apparatus of claim 1, wherein the scheduler executes a first current instruction by causing each of the subset of the functional units to be respectively bypassed, operated concurrently with other of the subset of the functional units and operated sequentially after said other of the subset of the functional units in a single period of operation.

3. The data processing apparatus of claim 2, wherein different forms of the first current instruction result in at least one of different functional unit schedules and different control information.

4. The data processing apparatus of claim 1, wherein the scheduler controller executes an instruction task by decoding an instruction and implementing an ordered operation on the subset of the plurality of functional units.

5. The data processing apparatus of claim 4, wherein the ordered operation of the subset of the plurality of functional units is variable.

6. The data processing apparatus of claim 4, wherein the subset of the plurality of functional units is variable.

7. The data processing apparatus of claim 1, wherein the plurality of functional units implements a predetermined instruction set.

8. The data processing apparatus of claim 7, wherein the predetermined instruction set is variable.

9. The data processing apparatus of claim 8, wherein the scheduler controller dynamically controls an activation of the plurality of functional units to execute a current instruction of the predetermined instruction set.

10. The data processing apparatus of claim 1, wherein the scheduler controller can implement at least one of additional instructions and additional functional units.

11. The data processing apparatus of claim 1, wherein the scheduler controller further comprises:
    a scheduler decoder that decodes the first current instruction to generate the functional unit schedule and the control information; and
    a plurality of scheduler functional unit controllers, wherein each of the scheduler functional unit controllers that controls self-timing of one of the subset of the functional units.

12. The data processing apparatus of claim 11, wherein the scheduler decoder includes an implementation of a logic table.

13. The data processing apparatus of claim 11, wherein said each of the scheduler functional unit controllers further comprises:
    a dependency monitor unit that generates a bypass signal and an execute signal; and
    a operation control unit that receives the bypass signal, the execute signal and a request signal and outputs an acknowledge signal.

14. The data processing apparatus of claim 13, wherein the dependency monitor unit further comprises:
    a bypass circuit that receives a dependency signal and outputs the bypass signal for a corresponding functional unit;
    a plurality of dependency circuits, wherein each of the plurality of dependency circuits receives the dependency signal and a corresponding acknowledge signal; and
    a control circuit that receives output signals from the plurality of dependency circuits and the bypass signal to output the execute signal for the corresponding functional unit.

15. The data processing apparatus of claim 13, wherein the operation control unit further comprises:
    first and second logic-gates, wherein the second logic-gate receives a reset signal and the acknowledge signal;
    a first C-gate that receives the request signal, the bypass signal and output signals of the first logic-gates and outputs a corresponding functional unit start signal;
    a second C-gate that receives the request signal, the execute signal and the output signals of the first and second logic-gates and outputs an intermediate signal; and
    a third C-gate that receives a finish signal from the corresponding functional unit, the request signal and the output signals of the first and second C-gates and outputs the acknowledge signal, wherein the first logic-gate receives the finish signal and the intermediate signal.

16. The data processing apparatus of claim 1, wherein the plurality of functional units includes at least one of a program counter unit, an instruction decoder unit, an arithmetic and logic unit, a multiplier unit, an indirect address register unit and a data storage unit.

17. The data processing apparatus of claim 1, wherein the scheduler controller uses a three-stage instruction pipeline and a four phase communication protocol, and wherein the communications device is a data bus.

18. A self-timed scheduler for use in a data processing apparatus having a plurality of functional units that each perform a set of prescribed operations, the scheduler comprising:

a scheduler controller that decodes at least one current instruction to generate a functional unit schedule and functional unit control information, wherein an asynchronous control structure of the scheduler controller implements the current instruction using self-timing initiation by requesting and completion signals as acknowledgment to control execution of a subset of the functional units according to the functional unit schedule; and a communication device coupling the functional units and the scheduler controller.

19. The data processing apparatus of claim 18, wherein the scheduler executes a first current instruction by causing each of the plurality of functional units to be one of bypassed, operated concurrently with other of the plurality of functional units and operated sequentially after said other of the plurality of functional units in a single period of operation to reduce an execution time of the first current instruction.

20. The data processing apparatus of claim 18, wherein different forms of the first current instruction result in at least one of different functional unit schedules and different control information, and wherein the communication device is a bus.

21. A data processing apparatus, comprising:

a plurality of functional units, each functional unit performing a set of prescribed operations;

a data bus coupling the functional units; and a scheduler controller coupled to the data bus that decodes a plurality of instructions each generating a corresponding functional unit schedule and control information wherein the scheduler controller executes first and second instructions of the plurality of instructions by implementing a series operation of a subset of the plurality of functional units according to the corresponding functional unit schedule and control information using self-timed handshake signals, wherein the handshake signals include a self-timing request signal and a self-timing acknowledgment signal, and wherein an execution time of the first instruction is different from an execution time of the second instruction.

22. The data processing apparatus of claim 21, wherein the scheduler executes a first current instruction by causing each of the plurality of functional units to be one of bypassed, operated concurrently with other of the plurality of functional units and operated sequentially after said other of the plurality of functional units.

23. The data processing apparatus of claim 22, wherein different forms of the first current instruction result in at least one of different functional unit schedules and different control information, and wherein each of the plurality of functional units comprises a functional unit controller controlling its self-timing.

24. The data processing apparatus of claim 21, wherein the plurality of functional units implements at least one of a predetermined instruction set and a user-defined instruction set.

25. A method of operating an asynchronous data processing apparatus having a plurality of functional units coupled by a data bus, wherein each of the plurality of functional units perform a set of prescribed operations, the method comprising:

decoding an instruction from a prescribed instruction set to generate a functional unit schedule and control information; and executing the decoded instruction using the functional unit schedule and the control information, wherein the executing step further comprises self-timing each operation period of the data processing apparatus so that sequential combinations of the functional units achieve differing time-length operation periods when implementing the instruction set.

26. The method of claim 25, wherein the executing step causes each of the plurality of functional units to be one of bypassed, operated concurrently with other of the plurality of functional units and operated sequentially after said other of the plurality of functional units.

27. The method of claim 25, wherein the decoding step decodes different forms of the instruction that result in different functional unit schedules and different control information.

28. The data processing apparatus of claim 11, wherein one of the plurality of scheduler functional unit controllers sequentially operates a second functional unit after a first functional unit in one operation period of the data processing apparatus, wherein the second functional unit uses data generated by the first functional unit in the one cycle.

29. The self-timed scheduler of claim 18, wherein the scheduler controller further comprises:

a scheduler decoder that decodes the at least one current instruction to generate the functional unit scheduler and the functional unit control information; and a plurality of scheduler functional unit controllers, wherein each of the scheduler functional unit controllers controls self-timing of one of the plurality of functional units, wherein the plurality of scheduler functional unit controllers sequentially operate a second functional unit after a first functional unit in one cycle of the data processing apparatus, wherein the second functional unit uses data generated by the first functional unit in the one cycle.

30. The method of claim 25, further comprises self-timing respective ones of the plurality of functional units, wherein a second functional unit of the plurality of functional units sequentially operates within one period of operation after a first functional unit using data generated by the first functional unit.

* * * * *